Aug. 7, 1951 P. E. REEVES 2,563,487

TELEVISION RECEIVER SYNCHRONIZING SYSTEM

Filed June 10, 1949

PIERCE E. REEVES
*INVENTOR.*

BY [signature]

HIS AGENT

Patented Aug. 7, 1951 2,563,487

UNITED STATES PATENT OFFICE 2,563,487

TELEVISION RECEIVER SYNCHRONIZING SYSTEM

Pierce E. Reeves, Los Angeles, Calif., assignor to Zenith Radio Corporation, a corporation of Illinois Application June 10, 1949, Serial No. 98,191

5 Claims. (Cl. 315—27)

Figure 1:
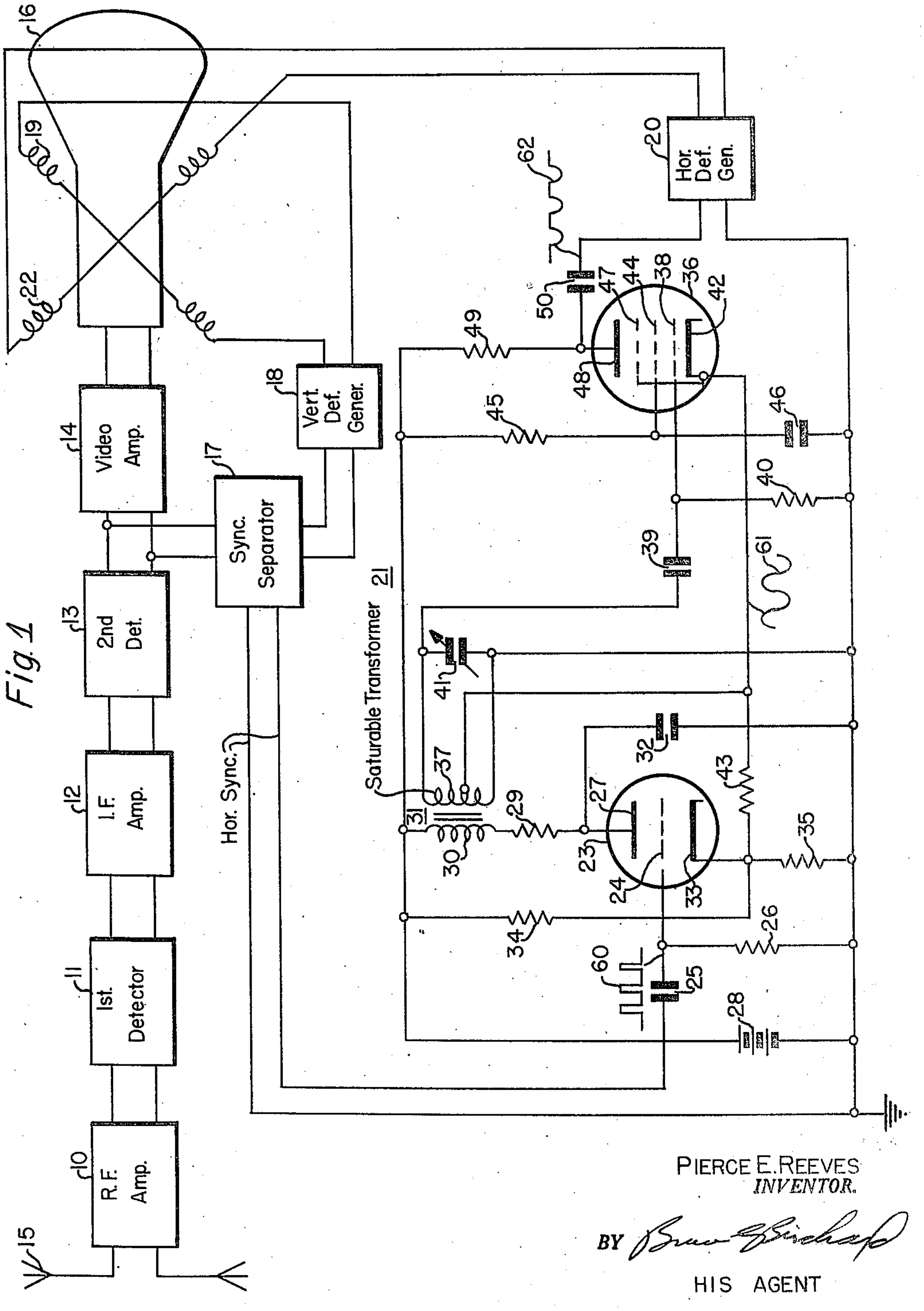

This invention relates to television receivers of the type employing a cathode-ray tube for reproducing an image from a received television signal, and more particularly to improved synchronizing systems for use in such receivers to cause an electron beam in the cathode-ray tube to be deflected in synchronism with the received signal.

In order to obtain satisfactory images on the screen of the cathode-ray tube in a television receiver, it is necessary that the synchronizing systems employed in the receiver, for driving the deflection generators therein in synchronism with received television signals, exhibit a high degree of immunity to noise disturbances and the like. This is particularly important in the case of the relatively high frequency horizontal, or line, synchronizing system, since this system is highly sensitive to such noise disturbances which tend to destroy both the synchronization and the interlace of the reproduced image.

To overcome the deleterious effects of these noise disturbances, synchronizing systems have been proposed that have a high degree of immunity to such disturbances. One type, for example, consists of an oscillator circuit, a reactance tube circuit for controlling the frequency of the oscillator circuit, and a discriminator network adapted to receive a signal of sinusoidal waveform from the oscillator circuit and synchronizing pulses from a received television signal. The discriminator network develops a control potential having a magnitude and sense dependent upon the phase relation between the sine wave and synchronizing pulses applied thereto, and this potential is applied to the reactance tube circuit, which in turn controls the frequency of the oscillator circuit. The disadvantage of this system is that it requires a relatively large number of discharge devices, and is quite complicated and expensive.

It is an object of the present invention to provide an improved synchronizing system for use in television receivers, and the like, to cause the electron beam in the cathode-ray tube included in such receivers to be deflected in synchronism with the synchronizing-signal components of a received television signal.

Another object of this invention is to provide such an improved synchronizing system which exhibits a high degree of immunity to noise disturbances and other extraneous signals.

Yet another object of this invention is to provide such an improved synchronizing system that is extremely accurate and reliable in operation, yet uses a minimum of component parts and electron-discharge device circuits.

A still further object of this invention is to provide such an improved synchronizing system that is relatively economical to manufacture.

The features of this invention which are believed to be new are set forth with particularity in the appended claims. The invention itself, however, together with further objects and advantages thereof, may best be understood by reference to the following description when taken in conjunction with the accompanying drawing, in which the single figure represents a preferred embodiment of the invention.

Referring now to the single figure, the television receiver illustrated therein comprises, a radio-frequency amplifier 10, a first detector 11, an intermediate-frequency amplifier 12, a second detector 13, and a video amplifier 14, all these components being cascade connected in the well-known manner to form a portion of a television receiver, and these components being of the type widely used in present-day television systems. The input terminals of the radio-frequency amplifier 10 may be connected to a suitable antenna 15, and the output terminals of the video amplifier 14 are connected to the control electrode and cathode of a cathode-ray image-reproducing tube 16 to control the intensity of the electron beam in this tube, in the usual fashion.

The output terminals of the second detector 13 are also connected to a synchronizing-signal separator circuit 17, and one pair of output terminals of the separator are connected to a vertical-deflection generator 18. The vertical-deflection generator 18 is connected to vertical beam-deflecting coils 19, or other suitable deflection elements, of the cathode-ray tube 16 to control the vertical sweep of the electron beam in this tube. A second pair of output terminals of the synchronizing-signal separator 17 are connected to a horizontal-deflection generator 20 through a synchronizing system represented generally as 21. The output terminals of the generator 20 are connected to horizontal beam-deflecting coils 22, or other suitable beam-deflection elements, of the tube 16 to control the horizontal sweep of the electron beam in the tube.

The synchronizing system 21 forms the basis of the present invention, and although this system is shown as included in the horizontal, or line, synchronizing circuit of the receiver; it may also be included in the vertical, or field, synchronizing circuit thereof, when so desired. The system 21 includes an electron-discharge device 23. One of the second pair of output terminals of the separator 17 is coupled to the control electrode 24 of the device 23 through a coupling capacitor 25, the other output terminal being connected to ground. The control electrode 24 is connected to ground through a grid-leak resistor 26. The anode 27 of the device 23 is connected to the positive terminal of a source of unidirectional potential 28 through a resistor 29 and the primary winding 30 of a saturable transformer 31, this anode being by-passed to ground through a capacitor 32. The cathode 33 of the device 23 is connected to the positive terminal of the source 28 through a resistor 34, and the cathode is further connected to ground through a resistor 35.

The synchronizing system 21 also includes a discharge device 36 which is connected as an oscillator circuit. One terminal of the secondary widing 37 of the saturable transformer 31 is coupled to the control electrode 38 of the device 36 through a capacitor 39, this control electrode being connected to ground through a grid-leak resistor 40. The winding 37 is shunted by a capacitor 41 to form the frequency-determining circuit of the oscillator. The cathode 42 of the device 36 is connected to the cathode 33 of the device 23 through a resistor 43, and is also connected to the center-tap of the winding 37. The screen electrode 44 of the device 36 is connected to the positive terminal of the source 28 through a resistor 45, and this electrode is by-passed to ground through a capacitor 46. The suppressor electrode 47 of the device 36 is connected to the cathode 42, and the anode 48 of this device is connected to the positive terminal of the source 28 through a resistor 48. The anode 49 is coupled to one of the input terminals of the horizontal-deflection generator 20 through a capacitor 50, the other input terminal thereof being grounded.

The radio-frequency amplifier 10 and the first detector 11 may be tuned to amplify and heterodyne a television signal intercepted by the antenna 15, and an intermediate-frequency signal is produced at the output terminals of the first detector 11 in response thereto. This intermediate-frequency signal is amplified in the intermediate-frequency amplifier 12, and detected in the second detector 13. The resulting video signals from the detector 13 are amplified in the video amplifier 14 and impressed on the control electrode of the receiver image tube 16 to control the intensity of the electron beam therein, in the well known manner.

The synchronizing-signal components of the received television signal are removed from the detected signal by means of the synchronizing-signal separator 17, and the vertical synchronizing pulses therefrom are used to drive the vertical-deflection generator 18 and, hence, the vertical sweep of the device 16, in synchronism with the vertical synchronizing-signal components of the received signal. The horizontal-synchronizing pulses from the separator 17 are supplied to the control electrode 24 of the device 23, these pulses having a positive polarity, as shown by the diagram 60.

The screen electrode 44, control electrode 38 and cathode 42 of the device 36 are connected to form a sine-wave oscillator, the winding 37 of the saturable transformer 31 and the capacitor 41, as previously stated, forming the frequency-determining circuit of this oscillator. The capacitor 41 may be varied to alter the frequency of the oscillator, and this capacitor is adjusted to a position wherein the free-running frequency of the oscillator is substantially equal to the repetition frequency of the horizontal-synchronizing pulses from the separator 17.

The sine-wave signal 61 from the oscillator is supplied to the cathode 33 of the device 23 through the resistor 43. The cathode 33 of this device is positively biased by the potentiometer arrangement of the resistors 34 and 35 shunted across the potential source 28. This bias is such that the device 23 is conductive only when the sine-wave 61 and the positive pulses 60 are applied thereto, and not to the sine-wave 61 alone. In this manner current pulses flow through the device 23 which have an amplitude that is a function of the phase relation between the pulses 60 and the sine-wave 61. These current pulses are integrated in an integrating circuit formed by the resistor 29 and capacitor 32, and give rise to a steady current flow through the primary winding 30 of the saturable transformer 31, this current having amplitude variations determined by the phase relation between the synchronizing pulses 60 and the sine wave 61.

The transformer 31 is so constructed that current variations in its primary winding 30 cause corresponding variations in the saturation of the core of this transformer. These variations in the core saturation alter the effective inductance of the winding 37 and, hence, the frequency of the oscillator of the device 36. The arrangement is such that when the phase between the pulses 60 and the sine wave 61 tends to shift so as to increase the current through the winding 30; the resulting increase in the saturation of the core of the transformer 31 alters the effective inductance of the winding 37 and, hence, the frequency of the oscillator in a compensating direction to tend to decrease the current through the winding 30.

The oscillator of the synchronizing system 21 is synchronized in the above described manner with the incoming synchronizing pulses. Noise disturbances have little or no effect on the synchronization of the oscillator since, due to their random nature, they are incapable of causing any material variation in the integrated current through the winding 30 of the saturable transformer 31. Furthermore, due to the inherent stability of sine wave oscillators, the oscillator continues to oscillate at substantially the frequency of the synchronizing pulses even during periods when these pulses are obliterated by noise or fading.

The device 36 is so biased that pulses 62 appear in its anode circuit in response to the positive peaks of the sine wave generated by the oscillator. These pulses 62 are utilized to drive the horizontal-deflection generator 20, in the usual fashion.

While a specific embodiment of the invention has been shown and described, modifications may be made, and it is intended in the appended claims to cover all such modifications as fall within the true spirit and scope of the invention.

I claim:

1. A deflection system for deflecting a cathode-ray beam in a television receiver cathode-ray image-reproducing device comprising: generator apparatus for supplying a deflection signal to said device; an oscillator coupled to said generator apparatus for driving said apparatus and including a resonant frequency-determining circuit; an inductive device having a magnetically saturable core included in said frequency-determining circuit of said oscillator; and a circuit coupled to the output of said oscillator, and responsive to the joint application of the output signal from said oscillator and a received synchronizing-pulse signal for supplying to said inductive device a control current having variations determined by the phase relation between said synchronizing-pulse signal and said output signal to vary the magnetic saturation of said core, thereby to control the inductance of said frequency-determining circuit and the operation of said oscillator.

2. A deflection system for deflecting a cathode-ray beam in a television receiver cathode-ray image-reproducing device comprising: generator apparatus for supplying a deflection signal to said device; a sine-wave oscillator coupled to said generator apparatus for driving said apparatus and including a resonant frequency-determining circuit; a transformer including a magnetically saturable core and a primary winding, and having a secondary winding included in said frequency-determining circuit of said oscillator; and an electron discharge-device circuit coupled to the output of said oscillator, and responsive to the joint application of the sine-wave signal from said oscillator and a received synchronizing-pulse signal, for supplying to said primary winding a control current having amplitude variations determined by the phase relation between said synchronizing-pulse signal and said sine-wave signal to vary the magnetic saturation of said core, thereby to control the inductance of said frequency-determining circuit and the frequency of said oscillator.

3. A deflection system for deflecting a cathode-ray beam in a television receiver cathode-ray image-reproducing device comprising: generator apparatus for supplying a deflection signal to said device, an oscillator coupled to said generator apparatus for driving said apparatus and including a resonant frequency-determining circuit; a transformer including a magnetically saturable core and a primary winding, and having a secondary winding included in said frequency-determining circuit of said oscillator; a circuit including an electron discharge device having an anode, a cathode, and a control electrode; an integrating network coupling said anode to said primary winding; means for supplying a received synchronizing-pulse signal to said control electrode; and means for supplying the sine-wave signal from said oscillator to said cathode; said circuit producing in said primary winding a current having amplitude variations determined by the phase displacement between said synchronizing-pulse signal and said sine-wave signal to vary the magnetic saturation of said core, thereby to control the inductance of said frequency-determining circuit and the frequency of said oscillator in a direction to compensate for such displacement.

4. A synchronizing system for use in television receivers, and the like, comprising: an oscillator for producing a control signal and including a resonant frequency-determining circuit; utilization means coupled to said oscillator and controlled by said control signal; an inductive device having a magnetically saturable core included in said frequency-determining circuit of said oscillator; and a circuit coupled to the output of said oscillator, and responsive to the joint application of said control signal and a received synchronizing signal, for supplying to said inductive device a current having variations determined by the phase displacement between said control signal and said synchronizing signal to vary the magnetic saturation of said core, thereby to control the inductance of said frequency-determining circuit and the operation of said oscillator in a sense to compensate for such displacement.

5. A synchronizing system for use in television receivers, and the like, comprising: an oscillator for producing a sine-wave signal and including a resonant frequency-determining circuit; utilization means coupled to said oscillator and controlled by said sine-wave signal; a transformer including a magnetically saturable core and a primary winding, and having a secondary winding included in said frequency-determining circuit of said oscillator; and a circuit coupled to the output of said oscillator, and responsive to the joint application of said sine-wave signal and a received synchronizing-pulse signal, for supplying to said primary winding a current having amplitude variations determined by the phase displacement between said sine-wave signal and said synchronizing-pulse signal to vary the magnetic saturation of said core, thereby to control the inductance of said frequency-determining circuit and the frequency of said oscillator in a direction to compensate for such displacement.

PIERCE E. REEVES.

REFERENCES CITED

The following references are of record in the file of this patent:

UNITED STATES PATENTS

| Number | Name | Date |
|---|---|---|
| 2,101,520 | Tolson et al. | Dec. 7, 1937 |
| 2,217,831 | Ballard | Oct. 15, 1940 |
| 2,253,355 | Taylor | Aug. 19, 1941 |
| 2,308,908 | Bahring | Jan. 19, 1943 |
| 2,320,551 | Bahring | June 1, 1943 |
| 2,358,297 | Bedford | Sept. 19, 1944 |
| 2,440,895 | Cawein | May 4, 1948 |
| 2,482,150 | Bocciarelli | Sept. 20, 1949 |